UNITED STATES PATENT OFFICE.

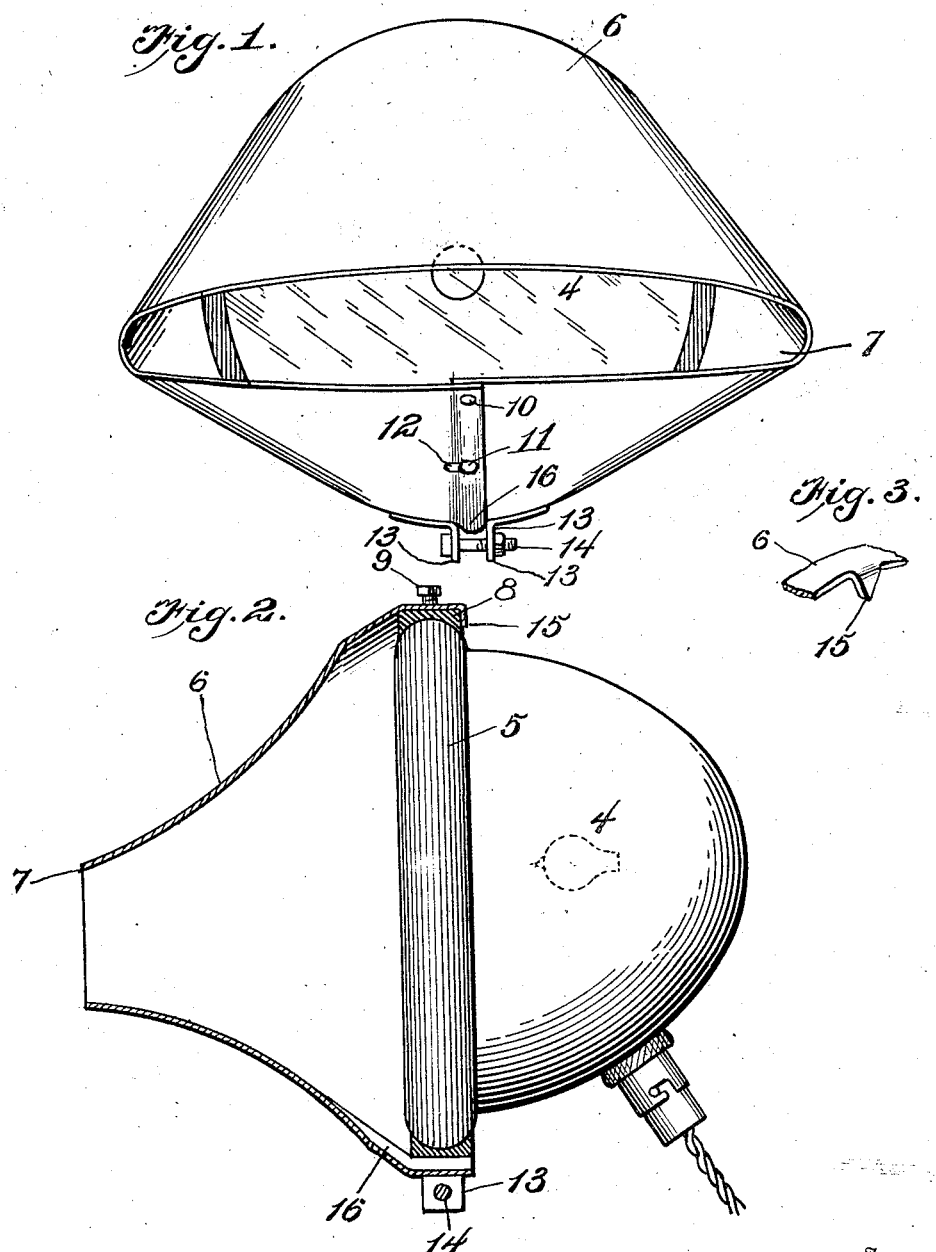

JOHN M. LARSON AND JOHN F. SIEVERS, OF DOWNEY, IDAHO.

LENS GUARD AND DIMMER.

1,420,848.  Specification of Letters Patent.  Patented June 27, 1922.

Application filed March 10, 1921. Serial No. 451,148.

*To all whom it may concern:*

Be it known that we, JOHN M. LARSON and JOHN F. SIEVERS, citizens of the United States, residing at Downey, in the county of Bannock and State of Idaho, have invented new and useful Improvements in Lens Guards and Dimmers, of which the following is a specification.

This invention relates to headlight structures for use upon motor vehicles, motor boats, motorcycles and other vehicles, and has for its primary object to provide means whereby diffusion of the rays emanating from the source of light will be overcome, and whereby such rays will be concentrated and directed properly in the course to be assumed by the vehicle and obviating the glare common to the now generally used undimmed or inadequately dimmed headlights.

A further object of the invention is to provide a lens guard or dimmer for the headlights of such construction that the lens will be protected from snow, sleet, rain, mud, dust, etc., so that a clear and bright light will at all times be insured, and which is of such construction that should the lens or any of the securing elements thereof become loose they can not become lost from the vehicle. Furthermore, the guard is of such construction as to minimize the opportunity for breakage or derangement, either of the lamp itself or the lens.

With these and other objects in view, the invention consists of the features of construction, combination and arrangement of parts, hereinafter fully described and claimed, reference being had to the accompanying drawing, in which:—

Figure 1 is a front elevation of a headlight of conventional construction, and illustrating the application thereto of a guard and dimmer constructed in accordance with the invention, Figure 2 is a side elevation of the headlight and showing in section the improved guard and dimmer, and Figure 3 is a detail fragmentary view of a portion of the dimmer rim and illustrating the manner in which the same may be secured to its supporting element.

Referring now more particularly to the drawing, 4 indicates the body of the headlight, and 5 the annular rim near the forward edge thereof.

The guard and dimmer of our invention consists of a body 6 formed of thin metal and having tubular formation, the rear end of said tube or body being of cylindrical shape and of a size slightly larger than the circumference of the rim 5 of the headlight. This body is so formed that the forward end presents an elliptical opening 7, such opening being formed by pressing upon the cylindrical tube upon opposite sides thereof, as is obvious. The material of which the body is formed will be of sufficient rigidity to maintain the shape described and illustrated.

The rear or circular end of the body is disposed over the rim 5 of the headlight, and suitable packing, such as the annular washer or filler 8 is interposed between the headlight rim and the inner surface of the body. A set screw 9 passing through the rear edge of the body may pass into the gasket 8 to prevent relative rotation of the latter with respect to the body.

As has been before stated, the invention in its preferred embodiment includes the body formed of a single strip or sheet of metal formed into a cylinder and having its ends secured together in overlapping relation. A rivet or bolt 10 passes through these overlapping ends at the forward extremity of the body, and a rivet 11 secured to one of the overlapping ends and passing through an elongated opening 12 disposed transversely of the adjacent overlapping section permits of slight movement of the said overlapping ends relative to each other. This slight movement will permit of the rear end of the body being expanded or contracted, as the situation may require, to adapt the said rear end to the rims of headlights not possessing great difference in diameters. In order that the hood or body may be firmly secured to the headlight, the adjacent relatively movable ends of the sheet metal are provided with outwardly extending parallel ears 13, through which passes the retaining bolt 14, and it will be understood that when the hood has been applied in the manner shown and the nut tightened upon bolt 14, the rear end of the hood will be contracted so as to firmly adapt itself over the bead or rim 5 of the headlight. To further assist in securing the hood in position, the latter may be provided at its rear extremity with one or more inwardly extending ears or prongs 15 to engage behind gasket 8.

In the base of the hood there is formed a groove or channel 16, the said channel being of shallow depth and communicating at its rear end with the atmosphere beyond the rim of the searchlight.

In the preferred embodiment of the invention, the hood body has an equal degree of pressure applied to both of its sides to produce the elongated or elliptical opening at the forward end, whereby such opening will be disposed in the longitudinal center of the body. It is obvious, therefore, that this elliptical opening will be axially alined with the headlight. It is obvious, however, that should it be found desirable, the hood may be so shaped that the opening would be disposed below the longitudinal center of the headlight, for obvious reasons.

When the hood or protector is applied in the manner above described, and the lamp is lighted, the rays emanating therefrom will pass forwardly through the hood and out of the elliptical opening 7 therein. It is preferred that the hood be nickeled or highly polished so as to add to the appearance or attractiveness of the device as well as to increase its efficiency as an illuminating structure. The light rays will be properly focused and projected in advance of the vehicle and will brilliantly illuminate the course to be traveled by the vehicle, yet the rays will be prevented from being projected sufficiently high to blind or confuse pedestrians or the drivers of on-coming vehicles. By reason of the particular construction and formation of the dimmer, rain, sleet, snow, mud, dust, etc., can not impair the lamp, as such matter will be prevented from engaging the lens of the headlight. All snow, water, dirt, etc., passing into the hood will drop to the bottom thereof and pass out beyond the rear of the hood through the channel or depression 16. The type of lamp to which the device of the present invention is particularly applicable, includes a rim 5 at the forward end of the lamp formed integral with the body 4 thereof, and the glass front of the lamp is held in this rim by an expanded ring inserted in the forward end of the rim 5. Should such ring become jarred loose, it will fall into the hood and will be retained thereby, as will the glass or any other of the detachable parts within the lamp.

From the foregoing it is obvious that we have provided a dimmer and protecting hood or guard of extremely simple construction and easy of application to the headlight, which will prove fully adequate in obtaining the objects set forth, and which may be manufactured and maintained at low cost. It is apparent that variations in the construction, combination and arrangement of parts may be resorted to without departing from the invention as defined by the claims.

Having thus fully described our invention, we claim:—

1. In a guard for headlights, a hood formed of a single sheet of material bent into substantially cylindrical shape and having its ends overlapping, the forward end of the hood being pressed to provide an elliptical opening, a rivet pivotally connecting the said overlapped ends at the forward extremity of said hood, ears secured one to each of the ends of the hood member at the rear of the same and disposed back from the overlapped portions of said hood, and a bolt connecting said ears.

2. In a guard for headlights, a hood formed of a single sheet of material shaped in cylindrical form, the ends of said sheet material being overlapped, a rivet pivotally connecting the overlapped ends of said material at the outer end of the hood, the opposite end of the hood being free to expand or contract to fit over a fixed lamp, a stud carried by one of said overlapped portions, the adjacent portion of the other overlapped portion having an elongated opening to receive said stud, the stud and slot construction limiting the degree of expansion and contraction of the hood, and clamping means at the inner end of the hood to fasten the latter to a fixed lamp.

In testimony whereof we affix our signatures.

JOHN M. LARSON.
JOHN F. SIEVERS.